United States Patent Office.

CHARLES HEBEL, OF LOUISVILLE, KENTUCKY.

Letters Patent No. 106,582, dated August 23, 1870.

IMPROVEMENT IN INK OR WRITING-FLUID.

The Schedule referred to in these Letters Patent and making part of the same

*To all whom it may concern:*

Be it known that I, CHARLES HEBEL, of Louisville, in the county of Jefferson and State of Kentucky, have invented a new and useful Improvement in Indelible Writing-Fluid; and I do hereby declare that the following is a full, clear, and exact description thereof, which will enable others skilled in the art to make and use the same.

This invention relates to a new and useful improvement in an indelible writing-fluid or ink, designed more especially for use in banks and for filling up notes, checks, bonds, and similar obligations, but applicable to all kinds of writing, by means of which frauds may be prevented in the alteration of such papers; and The invention consists in the composition formed as hereinafter described.

In carrying out my invention and discovery I make use of the following ingredients in about the proportions named:

In the first place I take eleven and a quarter pounds of ground nut-galls and thirteen ounces of red madder, slightly moistened and well mixed together, and packed in a percolator, and water added gradually until six gallons have passed through the percolator.

One pound of catechu and one and a half pound of sulphate of iron dissolved in one gallon of hot water are then added to the first solution; then stir into the solution thus obtained ten ounces acetate of iron.

Dilute eight ounces indigo chemic in one-half gallon of water, and combine with the solution above described; then dissolve one ounce aniline blue in one-half gallon of water, and stir it into the solution.

The composition thus formed is well filtered when it is fit for use.

This fluid resists the action of acids, rendering it impossible to fraudulently alter signatures or filling out of checks, notes, bonds, &c.

For marking linen the fluid is all that could be desired. It flows freely on paper or ironed linen, is not liable to mold, and never fades.

Having thus described my invention,

I claim as new and desire to secure by Letters Patent—

The indelible fluid above described, substantially as and for the purposes set forth.

CHAS. HEBEL.

Witnesses:
JACOB KRIEGER, Sr.,
FRED. C. LEBER, M. D.